(12) United States Patent
Ishikawa et al.

(10) Patent No.: US 9,102,027 B2
(45) Date of Patent: Aug. 11, 2015

(54) MACHINE TOOL AND METHOD OF CONTROLLING THE SAME

(75) Inventors: Toshiya Ishikawa, Susono (JP); Atsushi Tada, Numazu (JP); Masato Tominaga, Shizuoka-Ken (JP)

(73) Assignee: Toshiba Kikai Kabushiki Kaisha, Tokyo-to (JP)

( * ) Notice: Subject to any disclaimer, the term of this patent is extended or adjusted under 35 U.S.C. 154(b) by 732 days.

(21) Appl. No.: 13/363,628

(22) Filed: Feb. 1, 2012

(65) Prior Publication Data
US 2012/0197443 A1 Aug. 2, 2012

(30) Foreign Application Priority Data

Feb. 2, 2011 (JP) .................................. 2011-20745

(51) Int. Cl.
| | |
|---|---|
| G06F 19/00 | (2011.01) |
| G05B 19/25 | (2006.01) |
| G05B 19/18 | (2006.01) |
| B23Q 15/12 | (2006.01) |
| G05B 19/416 | (2006.01) |
| B23Q 5/32 | (2006.01) |
| B23Q 15/00 | (2006.01) |
| B23Q 15/14 | (2006.01) |

(Continued)

(52) U.S. Cl.
CPC ...... *B23Q 15/12* (2013.01); *B23Q 5/32* (2013.01); *G05B 19/4163* (2013.01); *G05B 19/4166* (2013.01); *B23Q 5/00* (2013.01); *B23Q 5/04* (2013.01); *B23Q 15/00* (2013.01); *B23Q 15/14* (2013.01); *B23Q 15/22* (2013.01); *B23Q 15/24* (2013.01); *Y10T 408/165* (2015.01)

(58) Field of Classification Search
CPC ........... G06B 19/4163; G06B 19/4166; B23Q 15/00; B23Q 15/14; B23Q 15/12; B23Q 15/22; B23Q 15/24; B23Q 5/00; B23Q 5/04; B23Q 5/32
USPC ................... 700/173; 318/569, 570, 571, 573
See application file for complete search history.

(56) References Cited

U.S. PATENT DOCUMENTS 3,622,766 A * 11/1971 David ............................ 318/601
3,784,798 A * 1/1974 Beadle et al. ................. 700/173

(Continued)

FOREIGN PATENT DOCUMENTS

| CN | 200977556 | 11/2007 |
|---|---|---|
| CN | 201271808 | 7/2009 |

(Continued)

OTHER PUBLICATIONS

English abstract of JP 2001-310210, Published Nov. 11, 2001.

(Continued)

*Primary Examiner* — Ronald Hartman, Jr.
(74) *Attorney, Agent, or Firm* — DLA Piper LLP (US)

(57) ABSTRACT

A machine tool which processes a machine target object using a main shaft which revolves, the machine tool includes a support portion which supports the main shaft; a first driving unit which revolves the main shaft about a first axis; a second driving part which feeds the main shaft from the support portion in a direction of the first axis; a control part which changes an upper limit value of a revolution speed of the main shaft according to a feeding length of the main shaft fed from the support portion; and a memory unit which associates and stores the upper limit value of the revolution speed and the feeding length.

8 Claims, 6 Drawing Sheets

(51) Int. Cl.
B23Q 15/22 (2006.01)
B23Q 15/24 (2006.01)
B23Q 5/00 (2006.01)
B23Q 5/04 (2006.01)

(56) References Cited

U.S. PATENT DOCUMENTS

| | | | |
|---|---|---|---|
| 4,074,349 A * | 2/1978 | Ueda | 700/180 |
| 4,115,858 A * | 9/1978 | Kaufman | 700/185 |
| 4,330,832 A * | 5/1982 | Kohzai et al. | 700/173 |
| 4,528,632 A * | 7/1985 | Nio et al. | 700/189 |
| 5,123,789 A | 6/1992 | Ohtani et al. | |
| 5,170,358 A * | 12/1992 | Delio | 700/177 |
| 6,225,772 B1 * | 5/2001 | Aizawa et al. | 318/571 |
| 6,535,788 B1 * | 3/2003 | Yoshida et al. | 700/191 |
| 6,591,158 B1 * | 7/2003 | Bieterman et al. | 700/187 |
| 6,629,017 B1 * | 9/2003 | Speth et al. | 700/169 |
| 6,999,843 B2 * | 2/2006 | Matsumoto et al. | 700/188 |
| 7,206,657 B2 * | 4/2007 | Esterling | 700/175 |
| 7,508,152 B2 * | 3/2009 | Xu | 318/571 |
| 7,847,506 B2 * | 12/2010 | Ogawa | 318/574 |
| 8,244,387 B2 * | 8/2012 | JianMing | 700/63 |
| 8,478,438 B2 * | 7/2013 | Nishibashi | 700/159 |
| 8,827,609 B2 * | 9/2014 | Ogura et al. | 409/231 |
| 8,972,040 B2 * | 3/2015 | Kimura et al. | 700/188 |
| 2002/0055805 A1 * | 5/2002 | Matsumoto et al. | 700/160 |
| 2005/0113959 A1 * | 5/2005 | Kajiyama | 700/181 |
| 2008/0086220 A1 * | 4/2008 | Ogawa | 700/15 |
| 2008/0100251 A1 * | 5/2008 | Xu | 318/571 |
| 2010/0114359 A1 * | 5/2010 | Kommareddy et al. | 700/173 |
| 2011/0190925 A1 * | 8/2011 | Fujishima et al. | 700/173 |
| 2012/0197421 A1 * | 8/2012 | Kimura et al. | 700/97 |

FOREIGN PATENT DOCUMENTS

| | | |
|---|---|---|
| CN | 201483023 | 5/2010 |
| DE | 43 39 770 | 5/1995 |
| JP | 61-117049 | 6/1986 |
| JP | 2001-162489 | 6/2001 |
| JP | 2001-310210 | 11/2001 |
| JP | 2005-153077 | 6/2005 |
| JP | 2007-326182 | 12/2007 |
| WO | WO 2010/103672 | 9/2010 |

OTHER PUBLICATIONS

English translation of JP 2001-310210, Published Nov. 11, 2001.
English Language Abstract of JP 2001-310210 published Nov. 6, 2001.
English Language Translation of JP 2001-310210 published Nov. 6, 2001.
Chinese Office Action issued in CN 201210023137 dated Dec. 3, 2013.
English Language Translation of Chinese Office Action issued in CN 201210023137 dated Dec. 3, 2013.
English Language Abstract for CN 201271808 published Jul. 15, 2009.
English Language Abstract for JP 61-117049 published Jun. 4, 1986.
English Language Abstract and Translation of JP 2001-162489 published Jun. 19, 2001.
English Language Abstract for WO 2010/103672 published Sep. 16, 2010.
English Language Abstract for CN 201483023 published May 26, 2010.
English Language Abstract for CN 200977556 published Nov. 21, 2007.
Japanese Office Action issued in JP 2011-020745 mailed Aug. 1, 2014 with English Language Translation.
English Language Abstract of JP 2007-326182 published Dec. 20, 2007.
English Language Translation of JP 2007-326182 published Dec. 20, 2007.
Japanese Office Action issued in JP 2011-020745 on Mar. 13, 2015 with English Language Translation.
English Language Abstract of JP 2005-150377 published on Jun. 16, 2005.
English Language Translation of JP 2005-150377 published on Jun. 16, 2005.
English Language Abstract of JP 2005-153077 published on Jun. 16, 2005.
English Language Translation of JP 2005-153077 published on Jun. 16, 2005.

* cited by examiner

| | FEED AMOUNT (FEED LENGTH) P | ALLOWABLE MAXIMUM REVOLUTION SPEED Smax |
|---|---|---|
| PARAMETER 1 | P1 | S1 |
| PARAMETER 2 | P2 | S2 |
| PARAMETER 3 | P3 | S3 |
| ⋮ | ⋮ | ⋮ |
| PARAMETER n | Pn | Sn |

MACHINE TOOL AND METHOD OF CONTROLLING THE SAME

CROSS-REFERENCE TO RELATED APPLICATION

This application is based upon and claims the benefit of priority from the prior Japanese Patent Application No. 2011-20745, filed on Feb. 2, 2011, the entire contents of which are incorporated herein by reference.

BACKGROUND OF THE INVENTION

1. Field of the Invention

The present invention relates to a machine tool and, for example, relates to a machine tool such as a boring machine for feeding a main shaft to perform boring.

2. Related Art

A horizontal boring machine has been conventionally used as one of NC (Numerical Control) machine tools. The horizontal boring machine has a main shaft which can be fed in a horizontal direction, this main shaft is fed in the horizontal direction (W axis direction) while being revolved and boring process of a machine target object is performed using a tool attached to a front end of the main shaft.

The horizontal boring machine has a support portion (a sleeve) which receives rotation of a motor, and the main shaft which is provided to revolve in synchronization with revolution of the sleeve. The main shaft has a rear end held by a ball bearing, and is configured to be fed along a sliding key in the sleeve in the horizontal direction (W axis direction). By this means, the horizontal boring machine can feed the main shaft in the W axis direction while revolving the main shaft.

The main shaft of the horizontal boring machine is supported by the sleeve and the ball bearing at the rear end. However, the sleeve does not move in the W axis direction, and therefore the supported state of the main shaft significantly changes according to the feed amount of the main shaft (the length of the fed main shaft). When, for example, the feed amount of the main shaft is a little (the feeding length is short), the entire main shaft is sufficiently supported by the sleeve and the ball bearing. By contrast with this, when the feed amount of the main shaft (the feeding length is long), the fed portion of the main shaft is not supported by the sleeve. This change of the supported state changes the critical revolution speed of the main shaft. When the revolution speed of the main shaft exceeds the critical revolution speed, the main shaft vibrates, and an excessive load is applied to the ball bearing at the rear end of the main shaft. In this case, processing accuracy decreases and, moreover, the ball bearing is likely to be damaged.

Although a machine tool having a small number of allowable maximum revolution of the main shaft or a machine tool of a little feed amount of the main shaft does not cause the above problem, it is demanded in recent years to revolve the main shaft at a high speed and process the main shaft in a complicated manner, and therefore the above problem cannot be neglected.

It is therefore an object of the present invention to provide a machine tool which can be controlled such that the revolution speed of the main shaft does not exceed a critical revolution speed even when the feed amount of the main shaft is changed.

SUMMARY OF THE INVENTION

A machine tool according to an embodiment of the present invention, the machine tool processing a machine target object using a main shaft which revolves, the machine tool includes:

a support portion which supports the main shaft; a first driving unit which revolves the main shaft about a first axis;

a second driving part which feeds the main shaft from the support portion in a direction of the first axis;

a control part which changes an upper limit value of a revolution speed of the main shaft according to a feeding length of the main shaft fed from the support portion; and a memory unit which associates and stores the upper limit value of the revolution speed and the feeding length.

A method of controlling a machine tool according to an embodiment of the present invention, the machine tool processing a machine target object using a main shaft which can revolve and can be fed from a support portion which supports the main shaft, the method includes:

associating and storing in the machine tool an upper limit value of the revolution speed and the feeding length; and setting the upper limit value of the revolution speed of the main shaft according to a feeding length of the main shaft fed from the support portion.

DETAILED DESCRIPTION OF THE INVENTION

Hereinafter, an embodiment according to the present invention will be described more specifically with reference to the drawings. The present embodiment by no means limits the present invention.

First Embodiment

Figure 1:
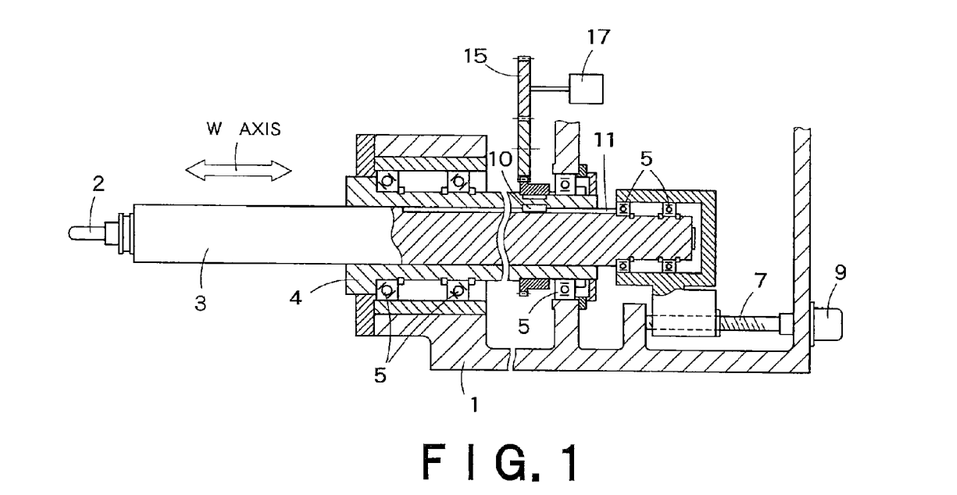
FIG. 1 is a view illustrating a configuration example of a machine tool according to a first embodiment of the present invention.

FIG. 1 is a view illustrating a configuration example of a machine tool according to a first embodiment of the present invention. The machine tool according to the present embodiment has a housing 1, a main shaft 3, a support portion 4, a revolution bearing 5, a gear 15, a first motor 17, a ball screw 7, a second motor 9, a revolution transmission key 10 and a keyway 11.

The housing 1 is configured to be movable as a case for the main shaft 3. The main shaft 3 is disposed to revolve about the W axis which is the first axis, with respect to the housing 1, and is disposed to be fed with respect to the housing 1 in the W axis direction.

The support portion (sleeve) 4 supports the main shaft 3, and functions to transmit the revolution operation of the gear 15 to the main shaft 3. Further, the support portion 4 is configured to feed the main shaft 3 in the W axis direction while revolving the main shaft 3 by means of the revolution transmission key 10 and the keyway 11.

The revolution bearing 5 is, for example, a ball bearing, and supports the support portion 4 in a revolvable state. The revolution bearing 5 supports the support portion 4 in a revolvable state by the front end and the rear end of the support portion 4, and the center portion if necessary.

The gear 15 transmits rotation of the first motor 17 to the support portion 4. The ball screw 7 feeds or pulls back the main shaft 3 in the W axis direction by way of rotation of the second motor 9.

The first motor 17 revolves the main shaft 3 through the gear 15 and the support portion 4. The second motor 9 revolves the ball screw 7 to feed the main shaft 3 from the support portion 4 or pull back the main shaft 3 to the support portion 4. The first and second motors 17 and 9 may be both servo motors.

With this configuration, the machine tool according to the present embodiment revolves the main shaft 3 in a state where the main shaft 3 is fed and the feed amount in the W axis direction is fixed, and then moves one of a work and the main shaft 3 or feeds the main shaft 3 while revolving the main shaft 3, so that it is possible to bore a machine target object (not illustrated) using a tool 2 attached at the front end of the main shaft 3.

Figure 2:
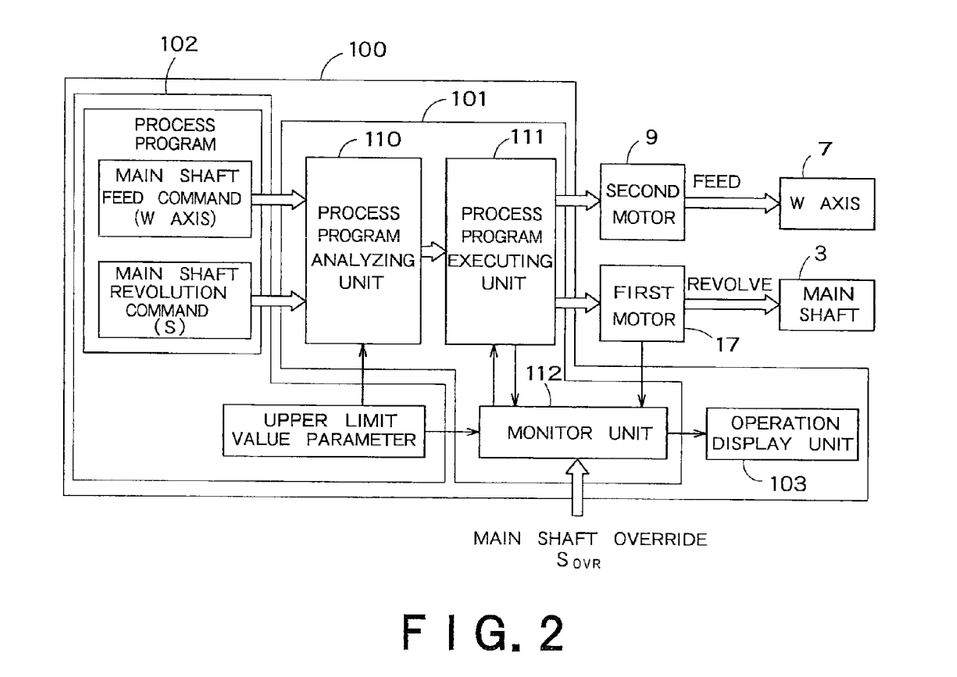
FIG. 2 is a block diagram illustrating a control device 100 of the machine tool according to the present embodiment.

FIG. 2 is a block diagram illustrating a control device 100 of the machine tool according to the present embodiment. The control device 100 is configured to control the motors 9 and 17, and is built in the machine tool.

The control device 100 is, for example, a NC control device, and has a control unit 101, a memory unit 102 and an operation display unit 103. The control device 100 gives commands to the first and second motors 17 and 9, and controls the revolution speed and the feed amount of the main shaft 3. In addition, the feed amount is the length of the main shaft 3 fed from the housing 1 or the support portion 4, in the W axis direction.

The control unit 101 is configured with, for example, a CPU, and has a process program analyzing unit 110, a process program executing unit 111 and a monitor unit 112. The process program analyzing unit 110 determines the allowable maximum revolution speed which is an upper limit value, using a process program and an upper limit value parameter from the memory unit 102. The process program executing unit 111 executes the process program, and controls the first and second motors 17 and 9 according to a main shaft feed command and a main shaft revolution command included in the process program. The monitor unit 112 monitors the revolution speed and the feed amount of the main shaft 3. Further, when the revolution speed of the main shaft 3 is likely to exceed the allowable maximum revolution speed determined in the process program analyzing unit 110, the process program executing unit 111 displays an alarm on the operation display unit 103 or generates an alarm sound from speakers. Furthermore, when the revolution speed of the main shaft 3 exceeds the allowable maximum revolution speed, the process program executing unit 111 may limit the revolution speed of the main shaft 3 to the allowable maximum revolution speed such that the revolution speed of the main shaft 3 does not exceed the allowable maximum revolution speed.

When the machine tool has a function (override function) of adjusting the revolution speed set by the process program, even if the revolution speed set by the process program is the allowable maximum revolution speed or less, the revolution speed of the main shaft 3 is likely to exceed the allowable maximum revolution speed due to override. Thus, even when the revolution speed of the main shaft 3 exceeds the allowable maximum revolution speed due to override, the process program executing unit 111 may limit the revolution speed of the main shaft 3 to the allowable maximum revolution speed such that the revolution speed of the main shaft 3 does not exceed the allowable maximum revolution speed. When the revolution speed set by the process program is 100%, override $S_{OVR}$ is a change ratio with respect to the set revolution speed. The override $S_{OVR}$ can be set by the operator between, for example, 50% and 200%. 200% of the override $S_{OVR}$ means the double speed of the revolution speed set by the process program. The override $S_{OVR}$ is input to the monitor unit 112 and is delivered to the process program executing unit 111. Further, an actual revolution speed of the main shaft 3 is fed back from the first motor 17 to the monitor unit 112.

The operation display unit 103 displays, for example, the actual revolution speed, the feed amount, a numerical value of override, the revolution speed set by the process program and the allowable maximum revolution speed of the main shaft 3 monitored by the monitor unit 112. The operation display unit 103 may be, for example, a touch panel display unit, and, in this case, the operator can also operate the machine tool using the operation display unit 103. For example, the override $S_{OVR}$ can be input to the operation display unit 103.

Figure 3:
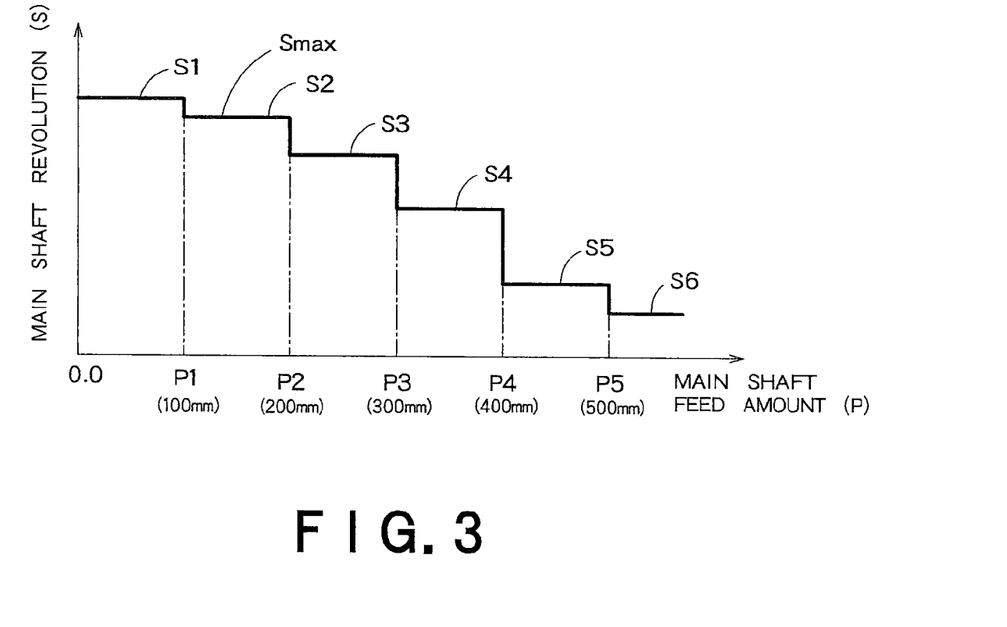
FIG. 3 illustrates a graph showing the relationship between an allowable maximum revolution speed Smax of the main shaft 3 and a feed amount P of the main shaft 3 according to the present embodiment.

FIG. 3 illustrates a graph showing the relationship between an allowable maximum revolution speed Smax of the main shaft 3 and a feed amount P of the main shaft 3 according to the present embodiment. As illustrated by the graph in FIG. 3, the control unit 100 changes the allowable maximum revolution speed (upper limit value) Smax of the revolution speed of the main shaft 3 according to the feed amount (feeding length) P of the main shaft 3 to be fed from the support portion 4.

When the feed amount P of the main shaft 3 is in the range of 0 mm to P1 (for example, P1=100 mm), the main shaft 3 is sufficiently supported by the support portion 4 and is stable, so that, even when the main shaft 3 revolves at a high speed, there is little risk that the main shaft 3 vibrates or is damaged. Hence, the allowable maximum revolution speed Smax is set to comparatively high S1.

When the feed amount P of the main shaft 3 is in the range of P1 to P2 (for example, P2=200 mm), the allowable maximum revolution speed Smax is set to S2 smaller than S1.

When the feed amount P of the main shaft 3 is in the range of P2 to P3 (for example, P3=300 mm), the allowable maximum revolution speed Smax is set to S3 smaller than S2. When the feed amount P of the main shaft 3 is in the range of P3 to P4 (for example, P4=400 mm), the allowable maximum revolution speed Smax is set to S4 smaller than S3. When the feed amount P of the main shaft 3 is in the range of P4 to P5 (for example, P5=500 mm), the allowable maximum revolution speed Smax is set to S5 smaller than S4. Further, when the feed amount P of the main shaft 3 is in the range equal to or more than P5, the allowable maximum revolution speed Smax is set to S6 smaller than S5.

Thus, the control unit 101 decreases the allowable maximum revolution speed Smax gradually from S1 to S5 when the feed amount P of the main shaft 3 becomes greater. In other words, the feed amount P is divided into a plurality of sections (0 to P1, P1 to P2, P2 to P3, P3 to P4 and P4 to P5), and the allowable maximum revolution speed Smax (the upper limit value of the revolution speed) is set per section of the feed amount P. This is to prevent vibration and damage even when the feed amount P of the main shaft 3 becomes large. In addition, the memory unit 102 only needs to store a table illustrated in FIG. 4 as the upper limit value parameter.

Figure 4:
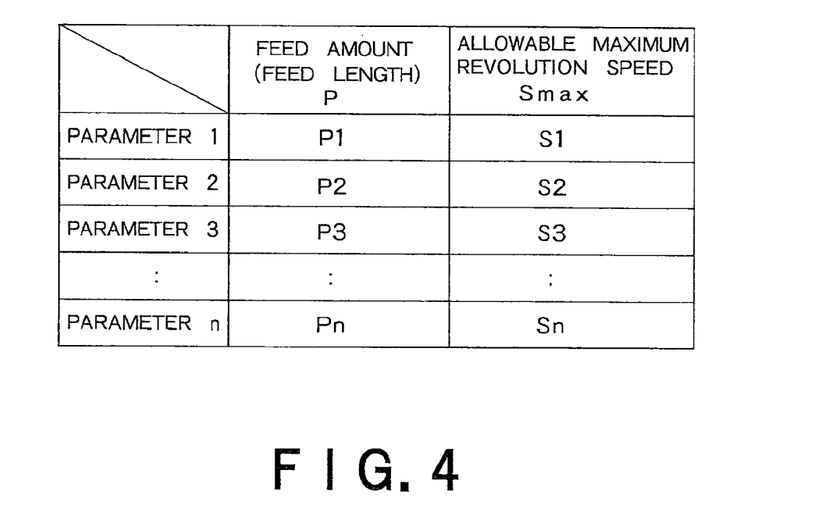
FIG. 4 illustrates an upper limit value parameter table showing the relationship between the allowable maximum revolution speed max and the feed amount P.

FIG. 4 illustrates an upper limit value parameter table showing the relationship between the allowable maximum revolution speed max (the upper limit value of the revolution speed) and the feed amount P. As illustrated in FIG. 4, the memory unit 102 associates and stores the allowable maximum revolution speeds Smax (S1 to Sn) of the main shaft 3 and the maximum feed amounts (P1 to Pn) in a section to which the actual feed amount P belongs. Meanwhile, n is an integer, and may be 6 or more or may be 4 or less.

For example, the maximum feed amount in the section between 0 to P1 is P1, and the allowable maximum revolution speed Smax in this section is S1. The maximum feed amount in the section between P1 and P2 is P2, and the allowable maximum revolution speed Smax in this section is S2. The maximum feed amount in the section between P2 and P3 is P3, and the allowable maximum revolution speed Smax in this section is S3. The maximum feed amount in the section between P3 and P4 is P4, and the allowable maximum revolution speed Smax in this section is S4. The maximum feed amount in the section between P4 and P5 is P5, and the allowable maximum revolution speed Smax in this section is S5. As described above, in the upper limit value parameter table, the parameters P1 to P5 are associated with the allowable maximum revolution speeds S1 to S5 in each section.

By comparing the actual feed amount P and P1 to Pn in the upper limit value parameter table, the process program analyzing unit 110 can detect to which section (0 to P1, P1 to P2, P2 to P3, . . . and Pn−1 to Pn) the actual feed amount P at the current point of time belongs. Further, the process program analyzing unit 110 can set the speed (one of S1 to Sn) matching the section to which the feed amount P belongs, to the allowable maximum revolution speed Smax according to the actual feed amount P.

The process program executing unit 111 controls the first motor 17 according to the allowable maximum revolution speed Smax set in the process program analyzing unit 110.

Next, the operation of the machine tool according to the present embodiment will be described in more detail.

Figure 5:
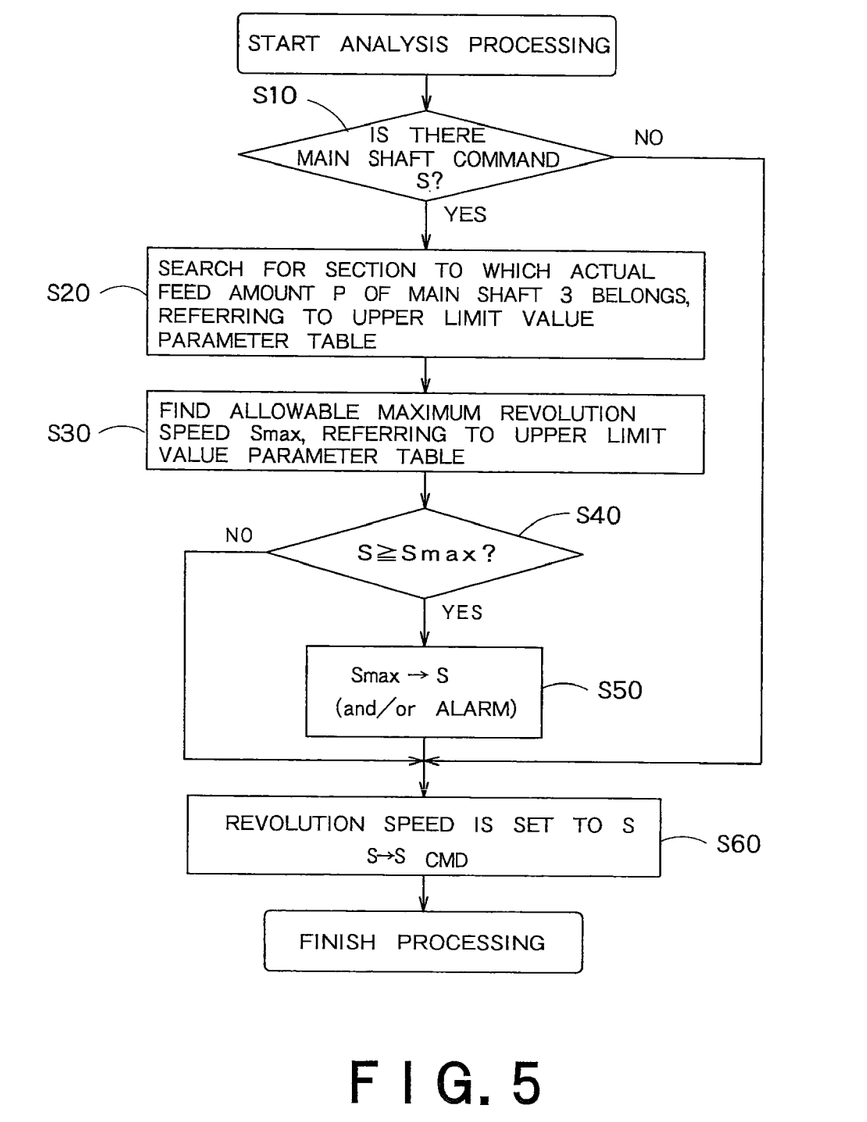
FIG. 5 is a flowchart illustrating a process program analyzing operation of the machine tool according to the present embodiment.

FIG. 5 is a flowchart illustrating a process program analyzing operation of the machine tool according to the present embodiment. First, the control unit 101 starts analysis from the head of the process program stored in the memory unit 102, and checks whether or not there is a main shaft revolution command S (S10). The main shaft revolution command S is a command for the revolution speed of the main shaft 3 set in the process program. The main shaft revolution command S also includes a desired revolution speed manually set by the operator.

When, for example, the main shaft revolution command S is set (YES in S10), the process program analyzing unit 110 searches for a section to which the actual feed amount P of the main shaft 3 belongs, referring to the upper limit value parameter table stored in the memory unit 102 (S20). More specifically, as illustrated in FIG. 6, the process program analyzing unit 110 compares and determines the actual feed amount P and the maximum feed amounts P1 to P5 in each section, respectively.

Figure 6:
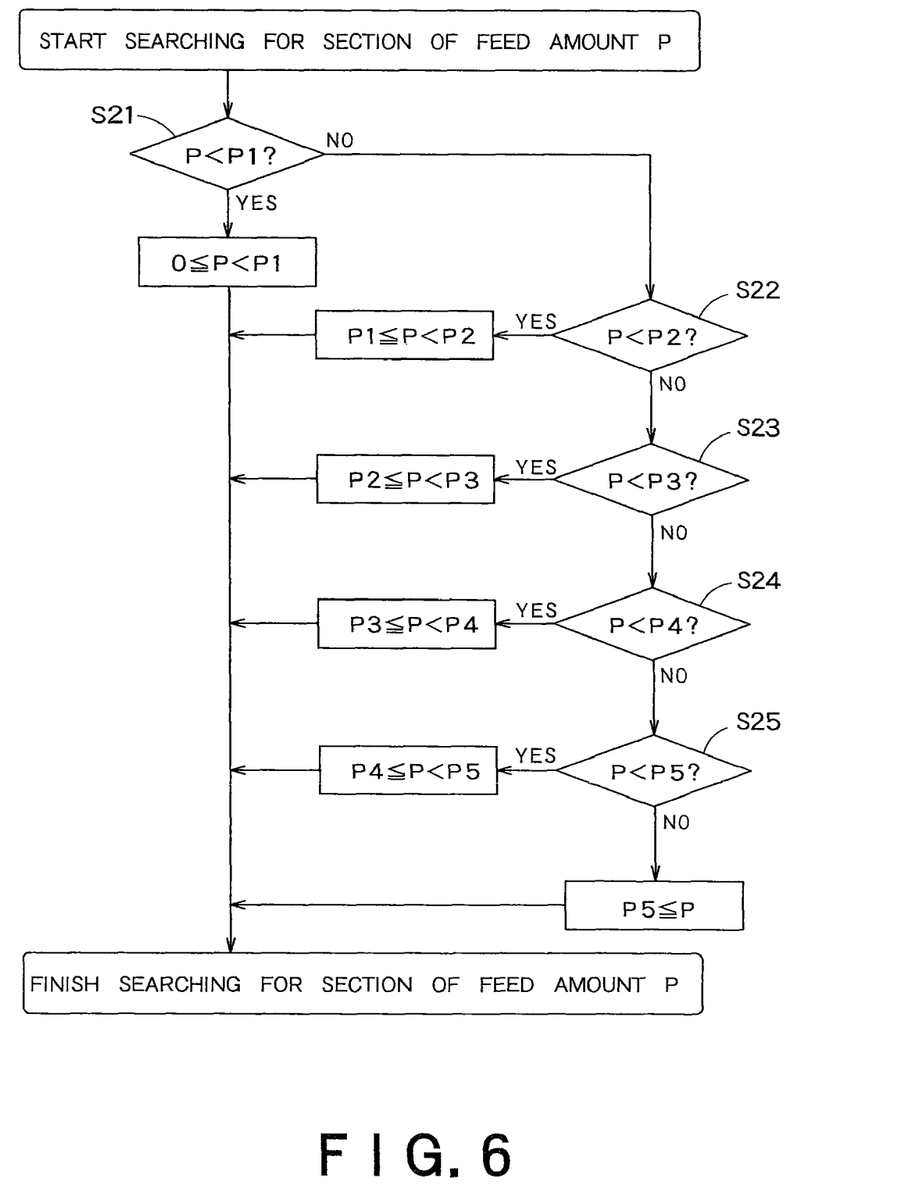
FIG. 6 is a flowchart illustrating a section search operation of the feed amount P.

FIG. 6 is a flowchart illustrating a section search operation of the feed amount P. First, the process program analyzing unit 110 compares the actual feed amount P and the maximum feed amount P1 (S21). When the actual feed amount P is smaller than the maximum feed amount P1 (YES in S21), the actual feed amount P is determined to belong to the section of $0 \leq P < P1$.

Similarly, when the actual feed amount P is the maximum feed amount P1 or more (NO in S21), the process program analyzing unit 110 compares the actual feed amount P and the maximum feed amount P2 (S22). When the actual feed amount P is smaller than the maximum feed amount P2 (YES in S22), the actual feed amount P is determined to belong to the section of $P1 \leq P < P2$.

When the actual feed amount P is the maximum feed amount P2 or more (NO in S22), the process program analyzing unit 110 compares the actual feed amount P and the maximum feed amount P3 (S23). When the actual feed amount P is smaller than the maximum feed amount P3 (YES in S23), the actual feed amount P is determined to belong to the section of $P2 \leq P < P3$.

When the actual feed amount P is the maximum feed amount P3 or more (NO in S23), the process program analyzing unit 110 compares the actual feed amount P and the maximum feed amount P4 (S24). When the actual feed amount P is smaller than the maximum feed amount P4 (YES in S24), the actual feed amount P is determined to belong to the section of $P3 \leq P < P4$.

When the actual feed amount P is the maximum feed amount P4 or more (NO in S24), the process program analyzing unit 110 compares the actual feed amount P and the maximum feed amount P5 (S25). When the actual feed amount P is smaller than the maximum feed amount P5 (YES in S25), the actual feed amount P is determined to belong to the section of $P4 \leq P < P5$.

Further, when the actual feed amount P is the maximum feed amount P5 or more (NO in S25), the actual feed amount P is determined to belong to the section of $P5 \leq P$.

In this way, a section to which the actual feed amount P belongs is determined.

FIG. 5 will be referred to again. Next, the process program analyzing unit 110 finds the allowable maximum revolution speed Smax matching a section to which the actual feed amount P belongs, referring to the upper limit value parameter table (S30). In this case, with the present embodiment, the allowable maximum revolution speed Smax is associated with a section of the feed amount on a one to one basis, and is set to a certain value per section. That is, when the section to which the feed amount P belongs changes, although the allowable maximum revolution speed Smax changes, the allowable maximum revolution speed Smax does not change as long as the feed amount P belongs to the same section.

Consequently, with the present embodiment, when the section to which the actual feed amount P belongs is determined in step S20, the allowable maximum revolution speed Smax is naturally determined by referring to the upper limit value parameter table.

When, for example, the actual feed amount P belongs to the section of $0 \leq P < P1$, the allowable maximum revolution speed Smax is set to S1. When the actual feed amount P belongs to the section of $P1 \leq P < P2$, the allowable maximum revolution speed Smax is set to S2. When the actual feed amount P belongs to the section of $P2 \leq P < P3$, the allowable maximum revolution speed Smax is set to S3. When the actual feed amount P belongs to the section of $P3 \leq P < P4$, the allowable maximum revolution speed Smax is set to S4. When the actual feed amount P belongs to the section of $P4 \leq P < P5$, the allowable maximum revolution speed Smax is set to S5. When the actual feed amount P belongs to the section of $P5 \leq P$, the allowable maximum revolution speed Smax is set to S6.

Next, the process program executing unit 111 drives the first and second motors 17 and 9 using the process program stored in the memory unit 102 and the allowable maximum revolution speed Smax analyzed and set in the process program analyzing unit 110.

The first and second motors 17 and 9 drive the main shaft 3 at the revolution speed S with the feed amount P according to the process program, and processes the process target object using a tool.

During processing of the process target object, when the revolution speed S is less than the allowable maximum revolution speed Smax (NO in S40), the process program executing unit 111 drives the first motor 17 according to the process program. That is, a revolution speed command $S_{CMD}$ is set to the command revolution speed S set by the process program (S60). In addition, the revolution speed command $S_{CMD}$ is a command for an actual main shaft revolution speed the process program executing unit 111 gives to the first motor 17.

By contrast with this, during processing of the process target object, when the command revolution speed S is the allowable maximum revolution speed Smax or more (YES in S40), the process program executing unit 111 sets the command revolution speed S to the allowable maximum revolution speed Smax (S50). The command revolution speed S becomes the allowable maximum revolution speed Smax, and therefore the revolution speed command $S_{CMD}$ is the allowable maximum revolution speed Smax in step S60. That is, the revolution speed command $S_{CMD}$ does not exceed the allowable maximum revolution speed Smax. By this means, it is possible to suppress vibration of the main shaft 3 and prevent the ball bearing 5 at the rear end of the main shaft 3 from being damaged.

In step S50, the process program executing unit 111 sets the command revolution speed S to the allowable maximum revolution speed Smax, and (or/instead of this) may generate an alarm. As an alarm, for example, warning content may be displayed on the operation display unit 103, or a warning sound may be emitted from speakers. By this means, the operator can learn that the command revolution speed S exceeds the allowable maximum revolution speed Smax. Further, the operator can set the override $S_{OVR}$ to suppress the revolution speed command $S_{CMD}$ to the allowable maximum revolution speed Smax or less.

In addition, in step S10, when there is no command revolution speed S (NO in S10), the revolution speed command $S_{CMD}$ maintains previous S as long as the previous command revolution speed S is not reset.

Figure 7:
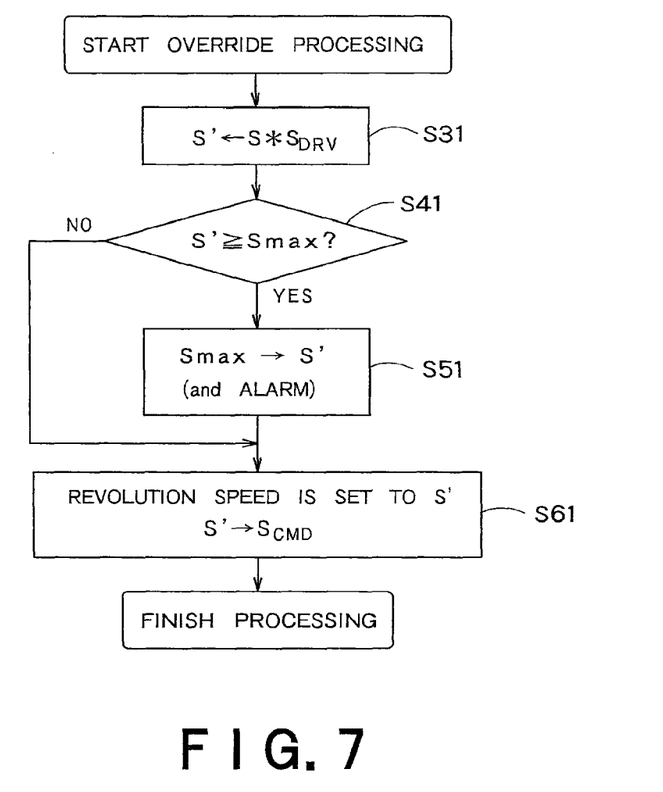
FIG. 7 is a flowchart illustrating an operation of override processing in the monitor unit 112.

FIG. 7 is a flowchart illustrating an operation of override processing in the monitor unit 112. As described above, the override processing is directed to changing the command revolution speed S according to an override ratio ($S_{OVR}$). Hereinafter, the override ratio is simply referred to as "override $S_{OVR}$".

When the override $S_{OVR}$ is set, the monitor unit 112 multiplies the command revolution speed S with the override $S_{OVR}$ (S31). Further, the override revolution speed S' ($S'=S*S_{OVR}$) is set as an actual revolution speed.

During processing of the process target object, when the override revolution speed S' is less than the allowable maximum revolution speed Smax (NO in S41), the process program executing unit 111 sets the revolution speed command $S_{CMD}$ to the override revolution speed S' (S61).

By contrast with this, during processing of the process target object, when the override revolution speed S' is the allowable maximum revolution speed Smax or more (YES in S41), the monitor unit 112 sets the override revolution speed S' to the allowable maximum revolution speed Smax (S51).

The override revolution speed S' is set to the allowable maximum revolution speed Smax and, in step S61, the revolution speed command $S_{CMD}$ becomes the allowable maximum revolution speed Smax. That is, even if override is used, the revolution speed command $S_{CMD}$ does not exceed the allowable maximum revolution speed Smax. By this means, even when override is used, it is possible to suppress vibration of the main shaft 3 and prevent the ball bearing 5 from being damaged.

In step S51, the process program executing unit 111 may use the allowable maximum revolution speed Smax as the command revolution speed S, and may generate an alarm.

As described above, with the present embodiment, it is possible to change the allowable maximum revolution speed Smax according to the feed amount P of the main shaft 3. By this means, even when the feed amount P of the main shaft 3 is changed in the process program, it is possible to suppress vibration of the main shaft 3 and prevent the ball bearing. 5 at the rear end of the main shaft 3 from being damaged without excessively decreasing the revolution speed command $S_{CMD}$ of the main shaft 3.

Further, the allowable maximum revolution speed Smax only needs to be set based on the critical revolution speed. For example, the allowable maximum revolution speed Smax may be a revolution speed calculated by decreasing a certain margin from the critical revolution speed. By this means, it is possible to set the allowable maximum revolution speed Smax to a high value as much as possible, and prevent an actual revolution speed of the main shaft 3 from excessively decreasing.

Further, with the present embodiment, by changing the allowable maximum revolution speed Smax according to the feed amount P of the main shaft 3, it is possible to prevent the main shaft 3 from being mechanically damaged.

Generally, the allowable maximum revolution speed Smax matching the feed amount P of the main shaft 3 cannot be checked according to the process program. However, with the present embodiment, by setting in advance the allowable maximum revolution speed Smax matching the feed amount P of the main shaft 3 as the upper limit value parameter, an automated, unmanned and high speed machine tool becomes accurate and safe.

Second Embodiment

Figure 8:
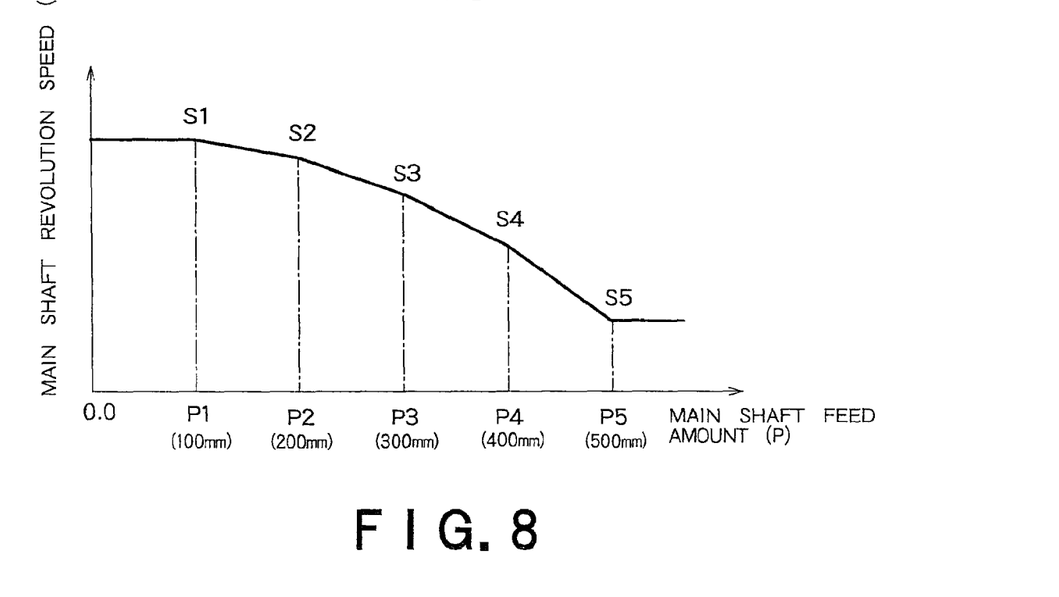
FIG. 8 illustrates a graph showing the relationship between an allowable maximum revolution speed Smax of the main shaft 3 and a feed amount P of the main shaft 3 according to a second embodiment.

FIG. 8 illustrates a graph showing the relationship between an allowable maximum revolution speed Smax of the main shaft 3 and a feed amount P of the main shaft 3 according to a second embodiment. With the second embodiment, the control unit 100 linearly changes the allowable maximum revolution speed Smax in each section according to the feed amount P of the main shaft 3.

When the feed amount P of the main shaft 3 is in the range of 0 to P1, the allowable maximum revolution speed Smax is set to S1. When the feed amount P of the main shaft 3 is in the range of P1 to P2, the allowable maximum revolution speed Smax linearly changes between S1 and S2. When the feed amount P of the main shaft 3 is in the range of P2 to P3, the allowable maximum revolution speed Smax linearly changes between S2 and S3. When the feed amount P of the main shaft 3 is in the range of P3 to P4, the allowable maximum revolution speed Smax linearly changes between S3 and S4. When the feed amount P of the main shaft 3 is in the range of P4 to P5, the allowable maximum revolution speed Smax linearly changes between S4 and S5. When the feed amount P of the main shaft 3 is in the range equal to or more than P5, the allowable maximum revolution speed Smax maintains S5.

In addition, a configuration of a machine tool according to the second embodiment may be the same as the configuration illustrated in FIGS. 1 and 2. Further, an upper limit value parameter table according to the second embodiment may be the same as in FIG. 4. With the second embodiment, processing in the process program analyzing unit 110 is different from that in the first embodiment.

Next, an operation of the machine tool according to the second embodiment will be described in more detail.

Figure 9:
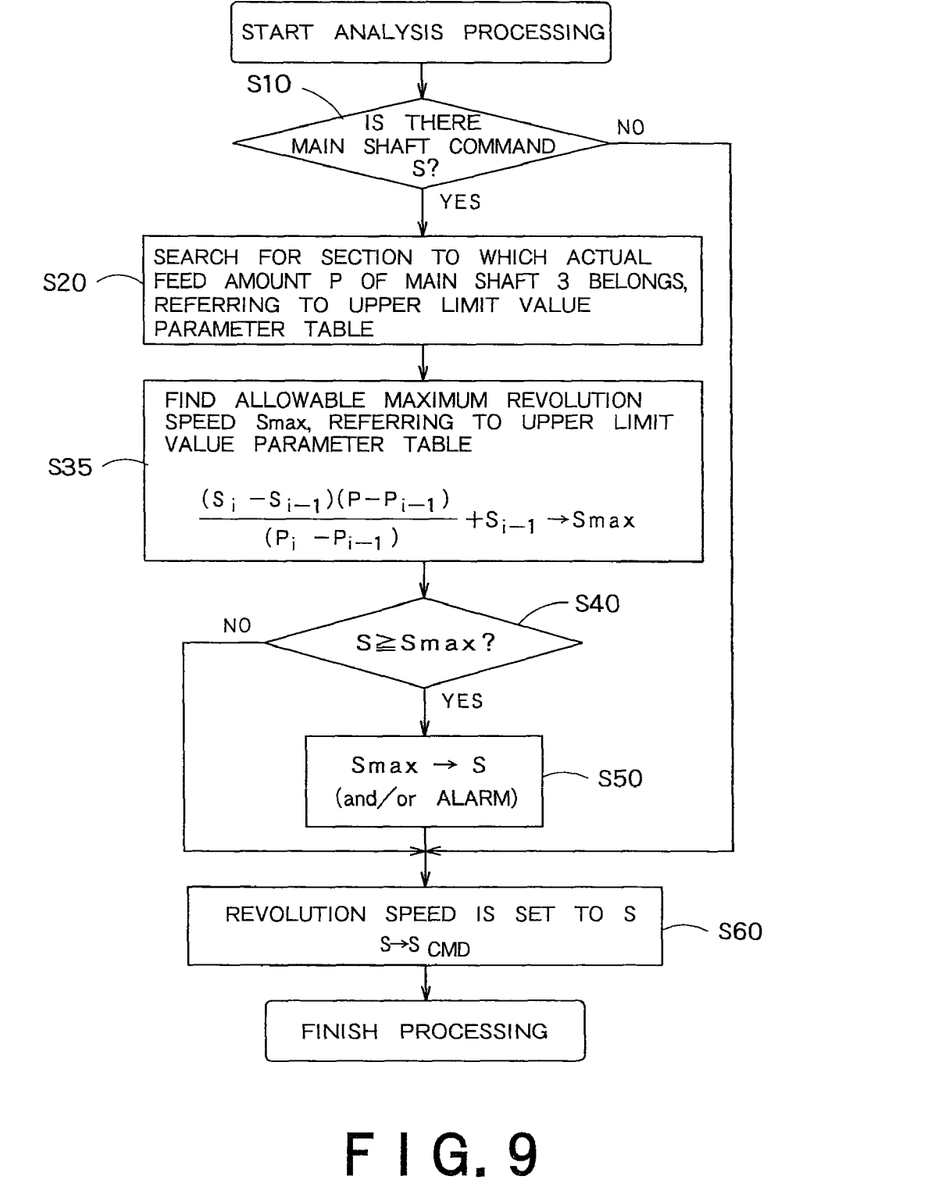
FIG. 9 is a flowchart illustrating a program analyzing operation of the machine tool according to the second embodiment.

FIG. 9 is a flowchart illustrating a program analyzing operation of the machine tool according to the second embodiment. Steps S10 and S20 are the same as steps S10 and S20 which have been described with reference to FIG. 5.

Next, the process program analyzing unit 110 finds the allowable maximum revolution speed Smax based on a position of an actual feed amount P (S35). In this case, the process program analyzing unit 110 calculates following equation 1.

$$Smax = [((S_i - S_{i-1})/(P_i - P_{i-1}))*(P - P_{i-1})] + S_{i-1} \quad \text{(Equation 1)}$$

Meanwhile, i is an integer between 0 to n. $S_i$ is an allowable maximum revolution speed in a section to which the feed amount P belongs. $S_{i-1}$ is an allowable maximum revolution speed in a section adjacent before the section to which the feed amount P belongs. $P_i$ is a maximum feed amount in a section to which the feed amount P belongs. $P_{i-1}$ is the maximum feed amount in a section adjacent before the section to which the feed amount P belongs. In addition, $(S_i - S_{i-1})/(P_i - P_{i-1})$ indicates an inclination of a line segment in a section to which the feed amount P belongs in the graph illustrated in FIG. 8.

By calculating equation 1, the process program analyzing unit 110 can find the allowable maximum revolution speed which linearly interpolates between the allowable maximum revolution speed $S_i$ in a section to which the feed amount P belongs and the allowable maximum revolution speed $S_{i-1}$ in a section adjacent before the section to which the feed amount P belongs, based on the actual feed amount P. By this means, with the second embodiment, it is possible to set the allowable maximum revolution speed Smax in a more fine manner.

Following steps S40 to S60 are the same as steps S40 to S60 which have been described with reference to FIG. 5.

With the second embodiment, the allowable maximum revolution speed between sections of the feed amount P is linearly interpolated, so that it is possible to accurately set the allowable maximum revolution speed Smax matching the actual feed amount P. Further, with the second embodiment, it is also possible to obtain the effect according to the first embodiment.

In addition, by increasing n in the second embodiment, the graph illustrated in FIG. 8 approximates to a curve, so that it is possible to more accurately set the allowable maximum revolution speed Smax.

The invention claimed is:

1. A machine tool which processes a machine target object using a main shaft which revolves, the machine tool comprising:
    a support portion which supports the main shaft;
    a first driving unit which revolves the main shaft about a first axis;
    a second driving part which feeds the main shaft from the support portion in a direction of the first axis;
    a control part which changes an upper limit value of a revolution speed of the main shaft according to a feeding length of the main shaft fed from the support portion; and
    a memory unit which associates and stores the upper limit value of the revolution speed and the feeding length.

2. The machine tool according to claim 1, wherein the feeding length is divided into a plurality of sections, and the upper limit value of the revolution speed is set per section of the feeding length.

3. The machine tool according to claim 2, wherein the memory unit associates and stores a maximum feeding length of the sections of the feeding length, and the upper limit value of the revolution speed.

4. The machine tool according to claim 2, wherein the upper limit value of the revolution speed is set to a constant value in the sections of the feeding length.

5. The machine tool according to claim 3, wherein the upper limit value of the revolution speed is set to a constant value in the sections of the feeding length.

6. The machine tool according to claim 2, wherein the upper limit value of the revolution speed is set to linearly change in the sections of the feeding length.

7. The machine tool according to claim 3, wherein the upper limit value of the revolution speed is set to linearly change in the sections of the feeding length.

8. The machine tool according to claim 6, wherein an upper limit value Smax of the revolution speed is determined according to Equation 1

$$Smax = [((S_i - S_{i-1})/(P_i - P_{i-1}))*(P - P_{i-1})] + S_{i-1} \quad \text{(Equation 1)}$$

(wherein i is an integer between 0 and n, $S_i$ is an allowable maximum revolution speed in a section to which a feed amount P belongs, $S_{i-1}$ is an allowable maximum revolution speed in a section adjacent before a section to which a feed amount P belongs, $P_i$ is a maximum feed amount in a section to which the feed amount P belongs, and $P_{i-1}$ is a maximum feed amount in a section adjacent before a section to which a feed amount P belongs).

* * * * *